(12) United States Patent
Park et al.

(10) Patent No.: US 10,364,348 B2
(45) Date of Patent: Jul. 30, 2019

(54) THERMOPLASTIC RESIN COMPOSITION AND MOLDED ARTICLE COMPRISING THE SAME

(71) Applicant: Lotte Advanced Materials Co., Ltd., Yeosu-si (KR)

(72) Inventors: Jeong Eun Park, Uiwang-si (KR); Kee Hae Kwon, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 309 days.

(21) Appl. No.: 15/248,086

(22) Filed: Aug. 26, 2016

(65) Prior Publication Data

US 2017/0058121 A1   Mar. 2, 2017

(30) Foreign Application Priority Data

Aug. 28, 2015 (KR) .......................... 10-2015-0122150

(51) Int. Cl.
| | | |
|---|---|---|
| *C08L 69/00* | (2006.01) | |
| *C08L 33/20* | (2006.01) | |
| *C08L 67/02* | (2006.01) | |
| *C08K 3/34* | (2006.01) | |

(52) U.S. Cl.
CPC ................ *C08L 69/00* (2013.01); *C08K 3/34* (2013.01); *C08L 33/20* (2013.01); *C08L 67/02* (2013.01)

(58) Field of Classification Search
CPC .......... C08L 69/00; C08L 33/20; C08L 67/02; C08K 3/34

USPC ........................................................ 524/513
See application file for complete search history.

(56) References Cited

U.S. PATENT DOCUMENTS

| | | |
|---|---|---|
| 2010/0160559 A1 | 6/2010 | Lee et al. |
| 2012/0065318 A1* | 3/2012 | Park .................. C08L 67/02 524/508 |
| 2014/0378598 A1 | 12/2014 | Park et al. |

FOREIGN PATENT DOCUMENTS

| | | |
|---|---|---|
| EP | 2199342 | 6/2010 |
| JP | 2013-213153 A | 10/2013 |
| KR | 10-1995-0018277 A | 7/1995 |
| KR | 10-1486567 B1 | 7/2016 |

OTHER PUBLICATIONS

Search Report in counterpart European Application No. 16186166.1 dated Jan. 17, 2017, pp. 1-6.
Office Action in counterpart Korean Application No. 10-2015-0122150 dated May 1, 2017, pp. 1-5.

\* cited by examiner

*Primary Examiner* — Ronald Grinsted
(74) *Attorney, Agent, or Firm* — Additon, Higgins & Pendleton, P.A.

(57) ABSTRACT

A thermoplastic resin composition and a molded article including the same are disclosed herein. The thermoplastic resin composition includes a base resin including a polycarbonate (PC) resin and a polyester resin, inorganic fillers, and an aromatic (meth)acrylate polymer, wherein the aromatic (meth)acrylate polymer is a copolymer of a monomer mixture including a vinyl cyanide monomer, an aromatic vinyl monomer, and an aromatic (meth)acrylate.

12 Claims, No Drawings

THERMOPLASTIC RESIN COMPOSITION AND MOLDED ARTICLE COMPRISING THE SAME

CROSS-REFERENCE TO RELATED APPLICATION

This application claims priority under 35 USC Section 119 to and the benefit of Korean Patent Application No. 10-2015-0122150, filed on Aug. 28, 2015 in the Korean Intellectual Property Office, the entire disclosure of which is incorporated herein by reference.

FIELD

The present invention relates to a thermoplastic resin composition and a molded article including the same.

BACKGROUND

Thermoplastic resins exhibit good properties, such as low specific gravity, good moldability, and good impact resistance, as compared with glass or metal, and are useful for housings of electrical/electronic products, automotive interior/exterior components, and exterior materials for buildings. Particularly, with the trend toward larger and lighter electrical/electronic products, plastic products produced from thermoplastic resins are quickly replacing existing glass and metal-based products.

For example, a blend of a polyester resin and a polycarbonate resin can exhibit both properties of the polyester resin such as high mechanical strength and good moldability and properties of the polycarbonate resin such as good thermal resistance, impact stability and dimensional stability.

In order for thermoplastic resin compositions to be applied to interior/exterior components for automobiles and buildings, there is a need for further improvement in dimensional stability and stiffness. In order to secure high stiffness, a thermoplastic resin composition can include organic/inorganic fillers. Such a thermoplastic resin composition, however, can exhibit deterioration in flowability, which can cause deterioration in injection molding workability and external appearance of a molded article formed of the thermoplastic resin composition.

Therefore, there is a need for a novel thermoplastic resin composition that can exhibit good properties in terms of stiffness, injection molding workability, and flowability.

SUMMARY OF THE INVENTION

The present invention provides a thermoplastic resin composition that can have high flexural modulus to provide good stiffness and can also exhibit good properties in terms of flowability, thermal stability and compatibility, and a molded article including the same.

The thermoplastic resin composition includes: a base resin including a polycarbonate (PC) resin and a polyester resin; inorganic fillers; and an aromatic (meth)acrylate polymer, wherein the aromatic (meth)acrylate polymer is a copolymer of a monomer mixture including a vinyl cyanide monomer, an aromatic vinyl monomer, and an aromatic (meth)acrylate.

The aromatic (meth)acrylate may include at least one compound represented by the following Formula 1:

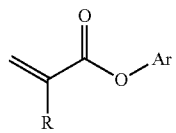
[Formula 1]

wherein Ar is a $C_6$ to $C_{20}$ aryl group, a $C_7$ to $C_{20}$ alkylaryl group or a $C_7$ to $C_{20}$ arylalkyl group, and R is hydrogen or a methyl group.

The aromatic (meth)acrylate may include at least one selected from among compounds represented by the following Formulae 1-1 to 1-5:

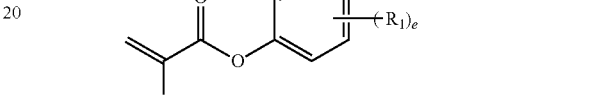
[Formula 1-1]

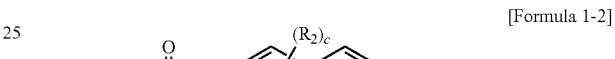
[Formula 1-2]

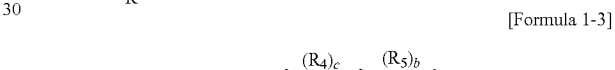
[Formula 1-3]

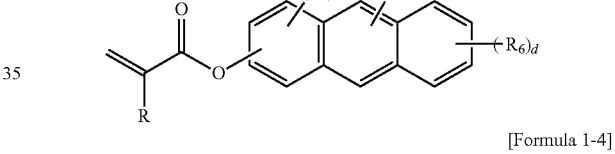
[Formula 1-4]

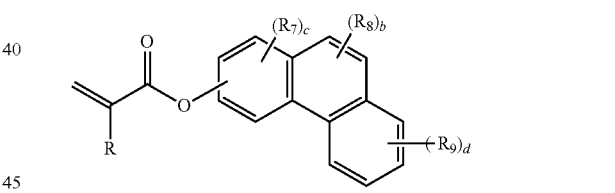
[Formula 1-5]

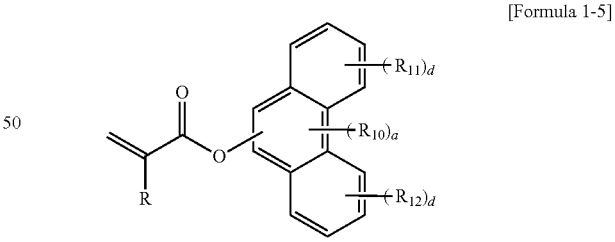

wherein each R is independently hydrogen or a methyl group; $R_1$ to $R_{12}$ are the same or different and are each independently a $C_1$ to $C_5$ alkyl group; a is 0 or 1; each b is the same or different and is independently an integer of 0 to 2; each c is the same or different and is independently an integer of 0 to 3; each d is the same or different and is independently an integer of 0 to 4; and e is an integer of 0 to 5.

The aromatic (meth)acrylate polymer may have a weight average molecular weight of about 30,000 g/mol to about 60,000 g/mol.

The polyester resin may include a repeat unit represented by the following Formula 2:

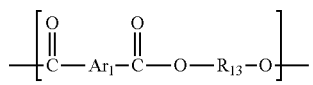

[Formula 2]

wherein $Ar_1$ is substituted or unsubstituted $C_6$ to $C_{18}$ arylene group and $R_{13}$ is a $C_1$ to $C_{20}$ linear alkylene group or a $C_3$ to $C_{20}$ branched alkylene group.

The polyester resin may optionally further include about 40% by mole (mol %) or less of a repeat unit represented by the following Formula 3:

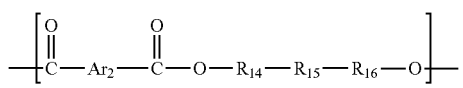

[Formula 3]

wherein $Ar_2$ is a substituted or unsubstituted $C_6$ to $C_{18}$ arylene group; $R_{14}$ and $R_{16}$ are the same or different and are each independently a single bond, a $C_1$ to $C_{20}$ linear alkylene group or a $C_3$ to $C_{20}$ branched alkylene group; and $R_{15}$ is a $C_3$ to $C_{20}$ cyclic alkylene group.

The polyester resin may have an inherent viscosity of about 0.5 dl/g to about 1 dl/g, as measured at 35° C. using an o-chlorophenol solution (concentration: 0.5 g/dl).

The aromatic (meth)acrylate polymer may be present in an amount of about 3 parts by weight to about 15 parts by weight relative to about 100 parts by weight of the base resin.

The inorganic fillers and the aromatic (meth)acrylate polymer may be present in a weight ratio of about 1:1 to about 15:1.

The thermoplastic resin composition may include about 100 parts by weight of the base resin including about 60% by weight (wt %) to about 80 wt % of the polycarbonate (PC) resin and about 20 wt % to about 40 wt % of the polyester resin; about 20 parts by weight to about 40 parts by weight of the inorganic fillers; and about 3 parts by weight to about 15 parts by weight of the aromatic (meth) acrylate polymer.

The inorganic fillers may include talc.

The thermoplastic resin composition may further include at least one additive selected from among antimicrobial agents, heat stabilizers, release agents, photostabilizers, dyes, surfactants, coupling agents, plasticizers, admixtures, lubricants, antistatic agents, pigments, toners, flame retardants, colorants, UV absorbers, UV blocking agents, nucleating agents, bonding aids, adhesives, and mixtures thereof.

Another embodiment of the present invention relates to a molded article including the thermoplastic resin composition as set forth above.

The molded article may have a spiral flow of about 35 cm or more, as measured under conditions of a mold temperature of 80° C. and an injection molding temperature of 270° C. in a mold having a 2 mm thick spiral cavity having a width of 5 mm, and a flexural modulus of about 35,000 kgf/cm² or more, as measured on a 6.4 mm thick specimen in accordance with ASTM D790.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

As used herein, the term "(meth)acrylate" may include an acrylate and/or a methacrylate.

As used herein, the term "copolymer" may include an oligomer, a polymer and/or a resin.

Hereinafter, a thermoplastic resin composition according to the present invention will be described in detail.

A thermoplastic resin composition according to exemplary embodiments of the present invention includes a base resin including a polycarbonate (PC) resin and a polyester resin; inorganic fillers; and an aromatic (meth)acrylate polymer, wherein the aromatic (meth)acrylate polymer is a copolymer of a monomer mixture including a vinyl cyanide monomer, an aromatic vinyl monomer, and an aromatic (meth)acrylate.

Base Resin

Polycarbonate (PC) Resin

The polycarbonate (PC) resin may be a polycarbonate resin used in a typical thermoplastic resin composition. For example, the polycarbonate (PC) resin may be an aromatic polycarbonate resin prepared by reacting one or more diphenols (for example, aromatic diol compounds) with a precursor, such as phosgene, halogen formate, and carbonic diester.

Examples of the diphenols may include without limitation 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-methyl-4-hydroxyphenyl)propane, 2,2-bis(3,5-dimethyl-4-hydroxyphenyl)propane, 2,2-bis(3-chloro-4-hydroxyphenyl)propane, 2,2-bis(3,5-dichloro-4-hydroxyphenyl)propane, and the like, and mixtures thereof. For example, the diphenol(s) may include 2,2-bis(4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, and/or 1,1-bis(4-hydroxyphenyl)cyclohexane, for example, 2,2-bis(4-hydroxyphenyl)propane, which is also referred to as bisphenol A.

The polycarbonate (PC) resin may be a branched polycarbonate resin. For example, the polycarbonate (PC) resin may be a branched polycarbonate resin prepared by adding a tri- or higher polyfunctional compound, for example, a tri- or higher valent phenol group-containing compound, in an amount of about 0.05 mol % to about 2 mol % based on the total number of moles of the diphenols used in polymerization.

The polycarbonate (PC) resin may be a homopolycarbonate resin, a copolycarbonate resin, or a blend thereof.

In addition, the polycarbonate (PC) resin may be partly or completely replaced by an aromatic polyester-carbonate resin obtained through polymerization in the presence of an ester precursor, for example, a bifunctional carboxylic acid.

The polycarbonate (PC) resin may have a weight average molecular weight (Mw) of about 15,000 g/mol or more, for example, about 15,000 g/mol to about 100,000 g/mol, for example about 17,000 g/mol to about 60,000 g/mol, and as another example about 20,000 g/mol to about 40,000 g/mol, as measured by gel permeation chromatography (GPC) with a polystyrene standard. Within this range of weight average molecular weights of the polycarbonate resin, a molded article formed of the thermoplastic resin composition can exhibit good properties in terms of flowability, thermal resistance, and flexural modulus.

The polycarbonate (PC) resin may have a melt-flow index (MI) of about 5 to about 40 g/10 min as measured under conditions of 250° C. and 10 kg in accordance with ISO 1133, without being limited thereto. In addition, the polycarbonate (PC) resin may be a mixture of two or more polycarbonate resins having different melt-flow indices.

The base resin can include the polycarbonate (PC) resin in an amount of about 60 wt % to about 80 wt %, for example about 60 wt % to about 75 wt %, and as another example about 65 wt % to about 75 wt %, based on the total weight (100 wt %) of the polycarbonate resin and the polyester resin of the base resin. In some embodiments, the base resin can include the polycarbonate resin in an amount of about 60, 61, 62, 63, 64, 65, 66, 67, 68, 69, 70, 71, 72, 73, 74, 75, 76, 77, 78, 79, or 80 wt %. Further, according to some embodiments, the amount of the polycarbonate resin can be in a range from about any of the foregoing amounts to about any other of the foregoing amounts.

Within this range, a molded article formed of the thermoplastic resin composition can exhibit good flowability and flexural modulus.

Polyester Resin

According to the present invention, the polyester resin may include a repeat unit represented by the following Formula 1:

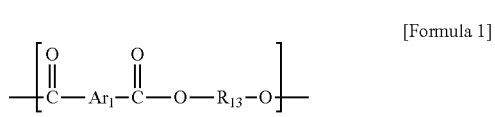

[Formula 1]

In Formula 1, $Ar_1$ is a substituted or unsubstituted $C_6$ to $C_{18}$ arylene group, for example a substituted or unsubstituted $C_6$ to $C_{12}$ arylene group, and as another example a substituted or unsubstituted $C_6$ to $C_{10}$ arylene group; and $R_{13}$ is a $C_1$ to $C_{20}$ linear alkylene group or a $C_3$ to $C_{20}$ branched alkylene group, for example a $C_1$ to $C_{10}$ linear alkylene group or a $C_3$ to $C_{12}$ branched alkylene group, and as another example a $C_1$ to $C_5$ linear alkylene group or a $C_3$ to $C_7$ branched alkylene group.

The polyester resin can increase flowability of the thermoplastic resin composition, which can improve processability of a molded article.

The repeat unit represented by Formula 1 may be obtained through polymerization of a dicarboxylic acid component including an aromatic dicarboxylic acid and a diol component including a $C_1$ to $C_{20}$ linear alkylene group or $C_3$ to $C_{20}$ branched alkylene group.

The dicarboxylic acid component may include an aromatic dicarboxylic acid and/or aromatic dicarboxylate used in a typical polyester resin, for example, a $C_8$ to $C_{20}$ aromatic dicarboxylic acid and/or aromatic dicarboxylate. In addition, the dicarboxylic acid component may further include a linear and/or cyclic aliphatic dicarboxylic acid, as needed.

Examples of the aromatic dicarboxylic acid may include without limitation terephthalic acid (TPA), isophthalic acid (IPA), phthalic acid, 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid; and examples of the aromatic dicarboxylate can include without limitation dimethyl terephthalate (DMT), dimethyl isophthalate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, and dimethyl-2,7-naphthalate. These may be used alone or in combination thereof. For example, terephthalic acid can be used.

The diol component may include a diol including a $C_1$ to $C_{20}$ linear alkylene group or a $C_3$ to $C_{20}$ branched alkylene group, and can provide good thermal resistance, mechanical strength and flowability to the thermoplastic resin composition.

Examples of the diol including a $C_1$ to $C_{20}$ linear alkylene group or a $C_3$ to $C_{20}$ branched alkylene group may include without limitation ethylene glycol, 1,3-propane-diol, 1,3-butanediol, 1,4-butanediol, 1,4-pentanediol, 1,5-pentanediol, 1,6-hexanediol, 3-methylpentane-2,4-diol, 2-methylpentane-1,4-diol, 2,2,4-trimethylpentane-1,3-diol, 2-ethylhexane-1,3-diol, 2,2-diethylpropane-1,3-diol, and the like, and mixtures thereof.

In another embodiment, the polyester resin may optionally further include about 40 mol % or less, for example about 30 mol % or less, and as another example about 20 mol % or less, based on the total mol % (100 mol %) of the polyester resin, of a repeat unit represented by the following Formula 2:

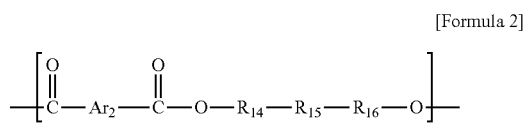

[Formula 2]

wherein in Formula 2, $Ar_2$ is a substituted or unsubstituted $C_6$ to $C_{18}$ arylene group, for example a substituted or unsubstituted $C_6$ to $C_{12}$ arylene group, and as another example a substituted or unsubstituted $C_6$ to $C_{10}$ arylene group; $R_{14}$ and $R_{16}$ are the same or different and are each independently a single bond, a $C_1$ to $C_{20}$ linear alkylene group or a $C_3$ to $C_{20}$ branched alkylene group, for example a single bond, a $C_1$ to $C_{10}$ linear alkylene group or a $C_3$ to $C_{12}$ branched alkylene group, and as another example a single bond, a $C_1$ to $C_5$ linear alkylene group or a $C_3$ to $C_7$ branched alkylene group; and $R_{15}$ is a $C_3$ to $C_{20}$ cyclic alkylene group, for example a $C_3$ to $C_{15}$ cyclic alkylene group, and as another example a $C_3$ to $C_{10}$ cyclic alkylene group.

In some embodiments, the polyester resin can include the repeat unit represented by Formula 2 in an amount of 0 (the repeat unit represented by Formula 2 is not present), about 0 (the repeat unit represented by Formula 2 is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 mol %. Further, according to some embodiments, the amount of the repeat unit represented by Formula 2 can be in a range from about any of the foregoing amounts to about any other of the foregoing amounts.

Within this range, the polyester resin can improve miscibility between the components of the thermoplastic resin composition, which can further improve properties of a molded article formed of the thermoplastic resin composition such as impact resistance, flowability, dimensional stability, external appearance, and the like.

The repeat unit represented by Formula 2 may be obtained through polymerization of a dicarboxylic acid component including an aromatic dicarboxylic acid and a diol component including a $C_3$ to $C_{20}$ cyclic alkylene group.

The aromatic dicarboxylic acid component may be substantially the same as the dicarboxylic acid component used in Formula 1.

The diol component may include a diol including a $C_3$ to $C_{20}$ cyclic alkylene group, which can improve miscibility between the components of the thermoplastic resin composition, and which can further improve properties to a molded article formed of the thermoplastic resin composition such as impact resistance, flowability, dimensional stability, external appearance, and the like.

Examples of the diol including a $C_3$ to $C_{20}$ cyclic alkylene group may include without limitation 1,4-cyclohexanediol, 1,4-cyclohexanedimethanol (CHDM), 1,4-cyclohexanediethanol, 1,4-cyclohexanedipropanol, 1,4-cyclohexanedibutanol, 1,4-cyclohexanolmethanol, 1,4-cyclohexanolethanol, 1,4-cyclohexanolpropanol, 1,4-cyclohexanolbutanol, 1,4-cyclohexanemethanolethanol, 1,4-cyclohexanemethanolpropanol, 1,4-cyclohexanemethanolbutanol, 1,4-cyclohexaneethanolpropanol, 1,4-cyclohexaneethanolbutanol, 1,4-cyclohexanepropanolbutanol, 1,3-cyclohexanediol, 1,3-cyclohexanedimethanol (CHDM), 1,3-cyclohexanediethanol, 1,3-cyclohexanedipropanol, 1,3-cyclohexanedibutanol, 1,3-cyclohexanolmethanol, 1,3-cyclohexanolethanol, 1,3-cyclohexanolpropanol, 1,3-cyclohexanolbutanol, 1,3-cyclohexanemethanolethanol, 1,3-cyclohexanemethanolpropanol, 1,3-cyclohexanemethanolbutanol, 1,3-cyclohexaneethanolpropanol, 1,3-cyclohexaneethanolbutanol, 1,3-cyclohexanepropanolbutanol, 1,2-cyclohexanediol, 1,2-cyclohexanedimethanol (CHDM), 1,2-cyclohexanediethanol, 1,2-cyclohexanedipropanol, 1,2-cyclohexanedibutanol, 1,2-cyclohexanolmethanol, 1,2-cyclohexanolethanol, 1,2-cyclohexanolpropanol, 1,2-cyclohexanolbutanol, 1,2-cyclohexanemethanolethanol, 1,2-cyclohexanemethanolpropanol, 1,2-cyclohexanemethanolbutanol, 1,2-cyclohexaneethanolpropanol, 1,2-cyclohexaneethanolbutanol, 1,2-cyclohexanepropanolbutanol, and the like, and mixtures thereof.

In exemplary embodiments, the polyester resin may be prepared through polycondensation of the dicarboxylic acid component and the diol component including the diol including a $C_1$ to $C_{20}$ linear alkylene group or a $C_3$ to $C_{20}$ branched alkylene group, and optionally, the diol including a $C_3$ to $C_{20}$ cyclic alkylene group. With these components, the thermoplastic resin composition can have the aforementioned effects.

The polyester resin may have an inherent viscosity of about 0.5 dl/g to about 1.0 dl/g, for example, about 0.6 dl/g to about 0.9 dl/g, as measured at 35° C. using an o-chlorophenol solution (concentration: 0.5 g/dl). Within this range of viscosity, the polyester resin can improve miscibility between the components of the thermoplastic resin composition, which can further improve properties to a molded article formed of the thermoplastic resin composition such as impact resistance, flowability, dimensional stability, external appearance, and the like.

The base resin can include the polyester resin in an amount of about 20 wt % to about 40 wt %, for example about 25 wt % to about 40 wt %, and as another example about 25 wt % to about 35 wt %, based on the total weight (100 wt %) of the polycarbonate resin and the polyester resin of the base resin. In some embodiments, the base resin can include the polyester resin in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, the polyester resin can be present in an amount of from about any of the foregoing amounts to about any other of the foregoing amounts.

Within this range, a molded article formed of the thermoplastic resin composition can have a good balance between thermal resistance and flowability.

Inorganic Filler

The inorganic fillers can improve mechanical strength, such as stiffness, of the thermoplastic resin composition, and any inorganic filler known in the art may be used without limitation.

The inorganic fillers may have a particle shape, a fiber shape, a rod shape, an acicular shape, a flake shape, and/or an amorphous shape. In addition, the inorganic fillers may have various cross-sectional shapes, such as a circular shape, an elliptical shape, and/or a rectangular shape. Examples of the inorganic fillers may include without limitation talc, glass beads, carbon black, mica, titanium whiskers, wollastonite, bentonite, montmorillonite, calcium carbonate, aluminum hydroxide, clay, glass fibers, carbon fibers, ceramic fibers, metal fibers, and the like, and mixtures thereof.

In exemplary embodiments, the inorganic fillers may be talc in terms of mechanical strength, without being limited thereto. If talc is used as the inorganic fillers, crystallization of the polyester resin in the thermoplastic resin composition can be further promoted to accelerate solidification of the thermoplastic resin composition upon injection molding, which can improve injection molding productivity and mechanical strength such as flexural modulus.

The inorganic fillers may have an average (median) particle diameter of about 0.1 m to about 2 m, for example about 0.5 m to about 1 m. Within this range of average particle diameter of the inorganic fillers, the thermoplastic resin composition can have a good balance between flexural modulus and compatibility.

The inorganic fillers may be subjected to surface treatment using an organic material in order to improve compatibility with the polycarbonate (PC) resin and the polyester resin, and dispersion in the thermoplastic resin composition.

The thermoplastic resin composition can include the inorganic fillers in an amount of about 20 to about 40 parts by weight, for example about 20 to about 35 parts by weight, based on about 100 parts by weight of the base resin including the polycarbonate resin and the polyester resin. In some embodiments, the thermoplastic resin composition can include the inorganic fillers in an amount of about 20, 21, 22, 23, 24, 25, 26, 27, 28, 29, 30, 31, 32, 33, 34, 35, 36, 37, 38, 39, or 40 parts by weight. Further, according to some embodiments of the present invention, the inorganic fillers can be present in an amount of from about any of the foregoing amounts to about any other of the foregoing amounts.

Within this range, the inorganic fillers can secure good flexural modulus and compatibility of the thermoplastic resin composition.

Aromatic (Meth)Acrylate Polymer

As used herein, the term "aromatic (meth)acrylate polymer" means a copolymer of a monomer mixture including a vinyl cyanide monomer, an aromatic vinyl monomer and an aromatic (meth)acrylate.

In this invention, the aromatic (meth)acrylate polymer can improve flowability, thermal stability and compatibility of the thermoplastic resin composition.

Specifically, in order to secure high dimensional stability and high flexural modulus, a high amount of the inorganic fillers can be provided to a thermoplastic resin composition. A thermoplastic resin composition including a high amount of the inorganic fillers, however, can suffer from deterioration in flowability and thermal stability. In contrast, when a thermoplastic resin composition including the aromatic (meth)acrylate polymer includes a high amount of the inorganic fillers, the inorganic fillers improve flowability of the thermoplastic resin composition, which can improve thermal stability and compatibility thereof.

Vinyl Cyanide Monomer

Examples of the vinyl cyanide monomer used in the aromatic (meth)acrylate polymer according to the present invention may include without limitation acrylonitrile, methacrylonitrile, ethacrylonitrile, phenyl acrylonitrile, α-chloroacrylonitrile, fumaronitrile, and the like, and mixtures thereof. For example, acrylonitrile, methacrylonitrile, or a mixture thereof may be used.

Aromatic Vinyl Monomer

Examples of the aromatic vinyl compound used in the aromatic (meth)acrylate polymer according to the present invention may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like, and mixtures thereof. For example, styrene, α-methylstyrene, or a mixture thereof may be used.

Aromatic (Meth)Acrylate

The aromatic (meth)acrylate used in the aromatic (meth)acrylate polymer according to the present invention may be represented by the following Formula 1:

[Formula 1]

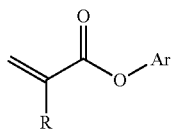

wherein Ar is a $C_6$ to $C_{20}$ aryl group, a $C_7$ to $C_{20}$ alkylaryl group or a $C_7$ to $C_{20}$ arylalkyl group, and R is hydrogen or a methyl group.

The aromatic (meth)acrylate may include at least one or more of compounds represented by the following Formulae 1-1 to 1-5, without being limited thereto:

[Formula 1-1]

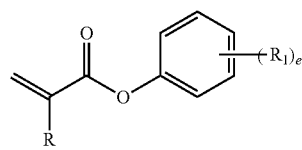

[Formula 1-2]

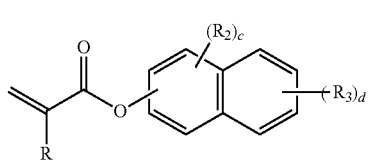

[Formula 1-3]

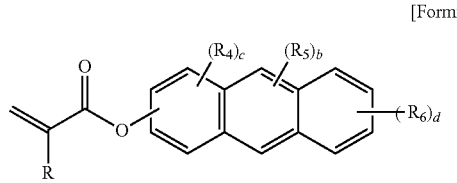

[Formula 1-4]

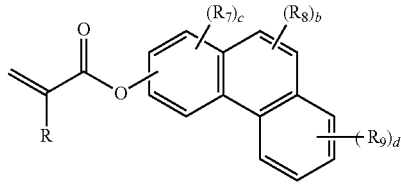

[Formula 1-5]

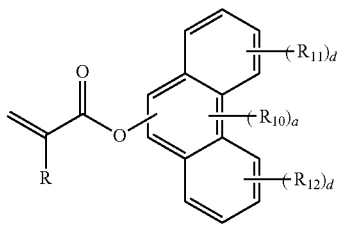

wherein each R is hydrogen or a methyl group; $R_1$ to $R_{12}$ are the same or different and are each independently $C_1$ to $C_5$ alkyl group; a is 0 or 1; each b is the same or different and is independently an integer of 0 to 2; each c is the same or different and is independently an integer of 0 to 3; each d is the same or different and is independently an integer of 0 to 4; and e is an integer of 0 to 5.

In exemplary embodiments, the aromatic (meth)acrylate may be phenyl methacrylate in terms of flowability, but is not limited thereto.

In exemplary embodiments, the aromatic (meth)acrylate polymer may be prepared through typical polymerization of a monomer mixture including the vinyl cyanide monomer, the aromatic vinyl monomer and the aromatic (meth)acrylate with a polymerization initiator, without being limited thereto. For example, the polymerization initiator may be a peroxide initiator, a persulfate initiator, an azo cyanide compound initiator, or a redox initiator, without being limited thereto.

The monomer mixture can include the aromatic (meth)acrylate in an amount of about 20 wt % to about 60 wt %, for example about 25 wt % to about 55 wt %, based on the total weight of monomers (100 wt %) in the monomer mixture. In some embodiments, the monomer mixture can include the aromatic (meth)acrylate in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments of the present invention, the aromatic (meth)acrylate can be present in an amount of from about any of the foregoing amounts to about any other of the foregoing amounts.

Within this range, the aromatic (meth)acrylate can secure good flowability and thermal stability of the thermoplastic resin composition.

The aromatic (meth)acrylate polymer may have a weight average molecular weight of about 30,000 g/mol to about 60,000 g/mol, for example about 35,000 g/mol to about 60,000 g/mol, and as another example, about 40,000 g/mol to about 60,000 g/mol. Within this range, the thermoplastic resin composition can exhibit good flowability with minimal or no deterioration in thermal stability.

The thermoplastic resin composition can include the aromatic (meth)acrylate polymer in an amount of about 3 parts by weight to about 15 parts by weight, for example about 3 parts by weight to about 13 parts by weight, based on about 100 parts by weight of the base resin including the polycarbonate resin and the polyester resin. In some embodiments, the monomer mixture can include the aromatic (meth)acrylate in an amount of about 3, 4, 5, 6, 7, 8, 9, 10, 11, 12, 13, 14, or 15 parts by weight. Further, according to some embodiments of the present invention, the aromatic (meth)acrylate can be present in an amount of from about any of the foregoing amounts to about any other of the foregoing amounts.

Within this range, the thermoplastic resin composition can exhibit good properties in terms of flowability, thermal stability, and compatibility.

In exemplary embodiments, the inorganic fillers and the aromatic (meth)acrylate polymer may be present in a weight ratio of about 1:1 to about 15:1, for example about 1:1 to about 10:1, and as another example about 2:1 to about 7:1. Within this range, the thermoplastic resin composition can exhibit good balance between flexural modulus, flowability, thermal stability, and compatibility.

Additive(s)

The thermoplastic resin composition according to the present invention may further include at least one or more additives selected from among antimicrobial agents, heat stabilizers, release agents, photostabilizers, dyes, surfactants, coupling agents, plasticizers, admixtures, lubricants, antistatic agents, pigments, toners, flame retardants, colorants, UV absorbers, UV blocking agents, nucleating agents, bonding aids, adhesives, and the like, and mixtures thereof, as needed.

The amount of the additive may be determined by the skilled artisan without undue experimentation depending upon purposes of the thermoplastic resin composition so as not to deteriorate the properties thereof.

The thermoplastic resin composition according to embodiments of the present invention may be prepared by a typical method known in the art. For example, the thermoplastic resin composition may be prepared in pellet form by mixing the above components and optional additive(s) using a Henschel mixer, a V blender, a tumbler blender, or a ribbon blender, followed by melt extrusion at about 200° C. to about 350° C. in a single-screw extruder or a twin-screw extruder. For example, the thermoplastic resin composition may be prepared in pellet form by extruding the mixture of the components and the optional additive(s) at about 250° C. to about 310° C. using a twin screw extruder.

A molded article according to the present invention is produced from the thermoplastic resin composition. For example, the molded article may be produced from the thermoplastic resin composition by a method known in the art, for example, injection molding, blow molding, extrusion molding, casting molding, or the like.

The molded article may have a spiral flow of about 35 cm or more, for example, about 35 cm to about 60 cm, and as another example about 37 cm to about 50 cm, as measured under conditions of a mold temperature of 80° C. and an injection molding temperature of 270° C. in a mold having a 2 mm thick spiral cavity having a width of 5 mm.

The molded article may have a flexural modulus of about 35,000 kgf/cm$^2$ or more, for example, about 35,000 kgf/cm$^2$ to about 60,000 kgf/cm$^2$, as another example about 37,000 kgf/cm$^2$ to about 60,000 kgf/cm$^2$, and as another example about 37,000 kgf/cm$^2$ to about 50,000 kgf/cm$^2$, as measured on a 6.4 mm thick specimen in accordance with ASTM D790.

Next, the present invention will be described in more detail with reference to the following examples. It should be understood that these examples are provided for illustration only and are not to be construed in any way as limiting the present invention.

Descriptions of details apparent to those skilled in the art will be omitted.

EXAMPLES

Details of components used in Examples and Comparative Examples are as follows.

(A) Polycarbonate resin (a1) An INFINO® series product (Samsung SDI Co., Ltd.) having a weight average molecular weight of 27,000 is used.

(a2) An INFINO® series product (Samsung SDI Co., Ltd.) having a weight average molecular weight of 24,000 is used.

(a3) An INFINO® series product (Samsung SDI Co., Ltd.) having a weight average molecular weight of 17,000 is used.

(B) Polyester resin (b1) SKYPET BB-8055 (SK Chemicals Co., Ltd.) having an inherent viscosity of 0.8 dl/g, as measured at 35° C. using an o-chlorophenol solution (concentration: 0.5 g/dl), is used.

(b2) SKYPET BR-8040 (SK Chemicals Co., Ltd.) having an inherent viscosity of 0.8 dl/g, as measured at 35° C. using an o-chlorophenol solution (concentration: 0.5 g/dl), is used.

(C) Inorganic fillers: Jetfine 3CA product (average particle diameter: 5 μm, Imerys Co., Ltd.) is used.

(D) Aromatic (meth)acrylate polymer: A phenyl methacrylate-styrene-acrylonitrile copolymer (PhMA-SAN) (Metablen TP003, Mitsubishi Rayon Co., Ltd.) having a weight average molecular weight of 50,000 g/mol is used.

(D'-1) A methyl methacrylate-styrene-acrylonitrile copolymer (MSAN) having a weight average molecular weight of 120,000 and comprising 75 wt % of methyl methacrylate (MMA) is used.

(D'-2) An ethylene-methyl acrylate copolymer (Elvaloy AC1330, DuPont Company) is used.

Example 1

100 parts by weight of a base resin comprising 70 wt % of the polycarbonate resin (a1) and 30 wt % of the polyester resin (b1), 30 parts by weight of the inorganic fillers (C), and 7 parts by weight of the aromatic (meth)acrylate polymer (D) are mixed in amounts as listed in Table 1, followed by melt-extrusion at 260° C. using a twin-screw extruder (L/D=29, Φ=36 mm), thereby preparing a thermoplastic resin composition in pellet form.

Examples 2 to 5 and Comparative Examples 1 to 6

Thermoplastic resin compositions are prepared in pellet form in the same manner as in Example 1 except for using the types and amounts of composition components listed in Table 1.

TABLE 1

| | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| (A) | (a1) | 70 | 60 | 75 | 55 | 70 | 70 | 60 | 75 | 70 | — | 60 |
| | (a2) | — | 10 | — | 10 | — | — | 10 | — | — | — | 10 |
| | (a3) | — | — | — | — | — | — | — | — | — | 70 | — |

TABLE 1-continued

|  |  | Example | | | | | Comparative Example | | | | | |
|---|---|---|---|---|---|---|---|---|---|---|---|---|
|  |  | 1 | 2 | 3 | 4 | 5 | 1 | 2 | 3 | 4 | 5 | 6 |
| (B) | (b1) | 30 | 30 | 25 | 35 | — | 30 | 30 | 25 | 30 | 30 | 30 |
|  | (b2) | — | — | — | — | 30 | — | — | — | — | — | — |
| Total (wt %) | | 100 | 100 | 100 | 100 | 100 | 100 | 100 | 100 | 100 | 100 | 100 |
| (C) (parts by weight) | | 30 | 25 | 25 | 20 | 30 | 30 | 25 | 25 | 30 | 20 | 20 |
| (D) (parts by weight) | | 7 | 5 | 11 | 3 | 7 | — | — | — | — | — | — |
| (D'-1) (parts by weight) | | — | — | — | — | — | — | — | — | 7 | — | — |
| (D'-2) (parts by weight) | | — | — | — | — | — | — | — | — | — | — | 7 |

Specimens are produced using the resin compositions of the Examples and Comparative Examples and evaluated as to the following properties. Evaluation results are shown in Table 2.

Evaluation of Properties

Preparation of specimen: The resin compositions prepared in pellet form are dried in an oven at 100° C. for 3 hours or more and are injection-molded using a 10 oz. injection molding machine at a molding temperature of 250° C. to 270° C. and a mold temperature of 60° C. to 80° C., thereby producing specimens for property evaluation in accordance with the corresponding standards for property evaluation.

(1) Stiffness (flexural modulus, kgf/cm$^2$): A specimen having a size of 6.4 mm×12.7 mm×125 mm is prepared by the above method and the flexural modulus of the specimen is measured in accordance with ASTM D790.

(2) Flowability (spiral flow, cm): Spiral flow (unit: cm) is measured under conditions of a mold temperature of 80° C. and an injection molding temperature of 270° C. in a mold having a 2 mm thick spiral cavity having a width of 5 mm. Higher spiral flow indicates better flowability.

(3) Thermal stability (Injection residence thermal stability): A specimen having a size of 2 mm×50 mm×200 mm is prepared by injection molding using a pin gate mold after the thermoplastic resin composition is left in a cylinder of an injection molding machine at 280° C. for 5 minutes. A surface of the specimen is observed by the naked eye. Generation of no gas silver streaks or less than 3 gas silver streaks is rated as ◯, generation of 3 to less than 6 gas silver streaks is rated as Δ, and generation of 6 or more gas silver streaks is rated as ×.

(4) Compatibility (peeling evaluation): The specimen for evaluation of thermal stability is observed by the naked eye to confirm peeling of the surface layer.

As shown in Table 2, the thermoplastic resin compositions of the Examples have high flexural modulus to provide good stiffness, and exhibit good properties in terms of flowability, thermal stability and compatibility. Conversely, the thermoplastic resin compositions of the Comparative Examples fail to exhibit improvement in such properties.

Although some embodiments have been described above, it should be understood that these embodiments are provided for illustration only and are not to be construed in any way as limiting the present invention, and that various modifications, changes, and alterations can be made by those skilled in the art without departing from the spirit and scope of the invention. Therefore, the scope of the present invention should be defined by the appended claims and equivalents thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A thermoplastic resin composition comprising:
    about 100 parts by weight of a base resin comprising about 65 wt % to about 80 wt % of a polycarbonate (PC) resin and about 20 wt % to about 35 wt % of a polyester resin;

TABLE 2

|  | Example | | | | | Comparative Example | | | | | |
|---|---|---|---|---|---|---|---|---|---|---|---|
|  | 1 | 2 | 3 | 4 | 5 | 1 | 2 | 3 | 4 | 5 | 6 |
| Flexural modulus (kgf/cm$^2$) | 41,000 | 38,000 | 38,000 | 35,000 | 37,000 | 37,000 | 35,000 | 35,000 | 38,000 | 36,000 | 33,000 |
| Spiral flow (270° C., cm) | 38 | 37 | 40 | 37 | 41 | 32 | 33 | 33 | 34 | 33 | 38 |
| Injection residence thermal stability (280° C.) | ◯ | ◯ | ◯ | ◯ | ◯ | ◯ | ◯ | ◯ | Δ | Δ | ◯ |
| Peeling evaluation | No | No | No | No | No | No | No | No | No | No | Severe | about 20 parts by weight to about 40 parts by weight of inorganic fillers; and about 3 parts by weight to about 15 parts by weight of an aromatic (meth)acrylate polymer;

wherein the aromatic (meth)acrylate polymer is a copolymer of a monomer mixture comprising a vinyl cyanide monomer, an aromatic vinyl monomer and an aromatic (meth)acrylate.

2. The thermoplastic resin composition according to claim 1, wherein the aromatic (meth)acrylate comprises at least one compound represented by Formula 1:

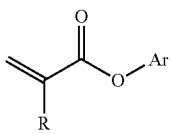

wherein Ar is a $C_6$ to $C_{20}$ aryl group, a $C_7$ to $C_{20}$ alkylaryl group or a $C_7$ to $C_{20}$ arylalkyl group, and R is hydrogen or a methyl group.

3. The thermoplastic resin composition according to claim 2, wherein the aromatic (meth)acrylate comprises at least one or more selected from among compounds represented by Formulae 1-1 to 1-5:

[Formula 1-1]

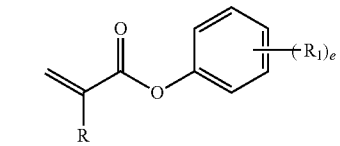

[Formula 1-2]

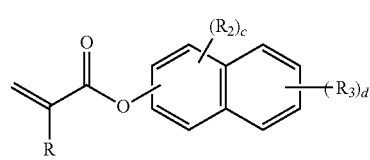

[Formula 1-3]

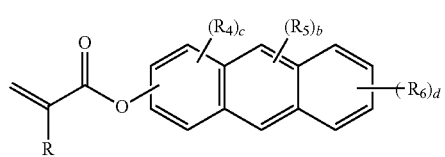

[Formula 1-4]

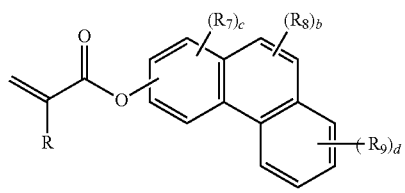

[Formula 1-5]

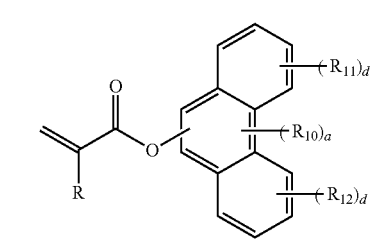

wherein each R is hydrogen or a methyl group; $R_1$ to $R_{12}$ are the same or different and are each independently a $C_1$ to $C_5$ alkyl group; a is 0 or 1; each b is the same or different and is independently an integer of 0 to 2; each c is the same or different and is independently an integer of 0 to 3; each d is the same or different and is independently an integer of 0 to 4; and e is an integer of 0 to 5.

4. The thermoplastic resin composition according to claim 1, wherein the aromatic (meth)acrylate polymer has a weight average molecular weight of about 30,000 g/mol to about 60,000 g/mol.

5. The thermoplastic resin composition according to claim 1, wherein the polyester resin comprises a repeat unit represented by Formula 2:

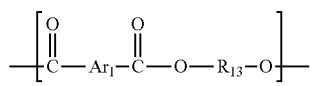

wherein $Ar_1$ is a substituted or unsubstituted $C_6$ to $C_{18}$ arylene group and $R_{13}$ is a $C_1$ to $C_{20}$ linear alkylene group or a $C_3$ to $C_{20}$ branched alkylene group.

6. The thermoplastic resin composition according to claim 5, wherein the polyester resin optionally further comprises about 40 mol % or less of a repeat unit represented by Formula 3:

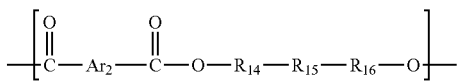

wherein $Ar_2$ is a substituted or unsubstituted $C_6$ to $C_{18}$ arylene group; $R_{14}$ and $R_{16}$ are the same or different and are each independently a single bond, a $C_1$ to $C_{20}$ linear alkylene group or a $C_3$ to $C_{20}$ branched alkylene group; and $R_{15}$ is a $C_3$ to $C_{20}$ cyclic alkylene group.

7. The thermoplastic resin composition according to claim 1, wherein the polyester resin has an inherent viscosity of about 0.5 dl/g to about 1 dl/g, as measured at 35° C. using an o-chlorophenol solution at a concentration of 0.5 g/dl.

8. The thermoplastic resin composition according to claim 1, wherein the inorganic fillers and the aromatic (meth)acrylate polymer are present in a weight ratio of about 1:1 to about 15:1.

9. The thermoplastic resin composition according to claim 1, wherein the inorganic fillers comprise talc.

10. The thermoplastic resin composition according to claim 1, further comprising:
at least one additive selected from the group consisting of antimicrobial agents, heat stabilizers, release agents, photostabilizers, dyes, surfactants, coupling agents, plasticizers, admixtures, lubricants, antistatic agents, pigments, toners, flame retardants, colorants, UV absorbers, UV blocking agents, nucleating agents, bonding aids, adhesives, and mixtures thereof.

11. A molded article comprising the thermoplastic resin composition according to claim 1.

12. The molded article according to claim 11, wherein the molded article has a spiral flow of about 35 cm or more, as measured under conditions of a mold temperature of 80° C. and an injection molding temperature of 270° C. in a mold having a 2 mm thick spiral cavity having a width of 5 mm, and a flexural modulus of about 35,000 kgf/cm² or more, as measured on a 6.4 mm thick specimen in accordance with ASTM D790.

* * * * *